United States Patent [19]

Flamme

[11] Patent Number: 5,503,511
[45] Date of Patent: Apr. 2, 1996

[54] ARRANGEMENT FOR THE SPRING ELASTIC POSITION FIXING OF FASTENING MEANS IN RECESSES

[75] Inventor: Hans Flamme, Unterhaching, Germany

[73] Assignee: Knurr-Mechanik fur die Elektronik Aktiengesellschaft, München, Germany

[21] Appl. No.: 168,260

[22] Filed: Dec. 17, 1993

[30] Foreign Application Priority Data

Dec. 18, 1992 [DE] Germany ................. 9217377 U

[51] Int. Cl.⁶ ..................................... F16B 27/00
[52] U.S. Cl. .................. 411/85; 411/104; 411/970
[58] Field of Search ................. 411/84, 85, 104, 411/432, 966, 970, 116

[56] References Cited

U.S. PATENT DOCUMENTS

| | | | |
|---|---|---|---|
| 2,703,663 | 3/1955 | Connett | 411/970 |
| 2,737,268 | 3/1956 | Smith | 411/85 |
| 2,767,609 | 10/1956 | Cousino | 411/85 |
| 2,767,951 | 10/1956 | Cousino | 411/970 |
| 2,825,379 | 3/1958 | Becker | 411/104 |
| 2,920,672 | 6/1960 | Bronson | 411/104 |

Primary Examiner—Flemming Saether
Attorney, Agent, or Firm—Keck, Mahin & Cate

[57] ABSTRACT

An arrangement is provided for the spring elastic position fixing of fasteners, e.g. spring nuts, in a recess, e.g. a T-slot. In smooth recesses, a reliable position fixing of a fastener, such as a rail, can be obtained if the fastener is placed in the recess. For spring elastic reception of the fastener, locking areas are formed in the fastener.

8 Claims, 2 Drawing Sheets

ARRANGEMENT FOR THE SPRING ELASTIC POSITION FIXING OF FASTENING MEANS IN RECESSES

This invention relates to an arrangement for the spring elastic position fixing of fastening means in recesses.

BACKGROUND OF THE INVENTION

For the construction of modular work place units with technical and electronic cabinets, work consoles and tables, and casings and subassembly units use is made of horizontal and vertical sections with recesses, particularly T-slots, in which nuts are placed for the fixing of components with screws.

German patent publication 2,635,439 C2 discloses a spring nut with a plate and a curved spring web, which is introduced through a slit in a T-slot and can be placed in the latter following a 90° rotation. As a result of the action of the spring web, the spring nut can be displaced in an elongated T-slot and can be held at a given point for fixing modular rails, hinges, etc.

More particularly, in the case of T-slots, in which a side leg is provided with a longitudinally directed perforated grid, it is advantageously possible to use a spring nut having a lockable spring web (DE-G-9,207,805.2). This spring nut permits a stable position fixing to be brought about by a locking element constructed on the spring web and, e.g., in the form of a locking stud. The locking element is locked in the perforated grid in a normal use position of the spring nut, i.e. with a plate of the latter engaging on the insertion slit. On rotating the spring nut by 90° or 180°, self-retention of the spring nut occurs by means of a locking stud supported or fixed on the bottom or in the insertion slit.

For many uses, it is unnecessary to provide elongated recesses, particularly the T-slots of a hollow section, with an additional perforated grid. A fixing of additional parts in the vicinity of the insertion slit with a spring nut located in the normal use position is adequate. Preference is given to the use of hollow sections with smooth T-slots extending therethrough.

SUMMARY OF THE INVENTION

The object of the invention is to bring about a reliable position fixing of a fastening means, particularly a spring nut displaceable in a T-slot, using particularly simple means and smooth recesses.

According to the invention, this object is achieved by an arrangement for spring elastic position fixing of fastening means in a recess. The recess is located in a rail of a flat material, which has locking areas for the spring elastic reception of the fastening means. Advantageous and other appropriate developments will become clear.

The invention is based on the idea of detachably providing an additional means for the position fixing of a fastening element, particularly a spring nut, in a recess, preferably a T-slot. The additional means preferably is insertable via the slit-like slot opening and, as a result of its design and material characteristics ensures proper spring elastic position fixing of the fastening means.

According to the invention, a rail formed, for example, from a flat material, is placed in a recess and has locking areas. By means of a spring elastic connection, the rail can adjustably retain the fastening means. This rail, which can extend over the entire length of a T-slot-like recess, or only over portions thereof, is advantageously insertable via the slit-like opening of the T-slot and can be fixed in the bottom.

Preferably, a strip or ledge-like rail is used as the flat material. The rail is placed on the bottom of the slot and is detachably fixed, preferably, by means of clamping elements, e.g. laterally positioned clamping tips. The locking areas for the rail are stud-like portions, which are, e.g., punched out or deep drawn. Onto these shaped portions, which are comparable to the studs of a lockable spring nut, can be clipped spring nuts by means of a spring web. This is the case if, in the vicinity of the curved spring web, complementary bores are provided.

The stud-like portions of the metal rail are arranged in grid-like manner. The grip size is adapted to the dimensions of the spring nuts to be locked or other fastening elements.

For the automatic, releasable, mounting of the metal rail in a force fit manner, the clamping elements are constructed in a resilient and, optionally wedge-like manner on the long side edges of the metal rail, so that there is an advantageous adjustment in one direction. Such an adjustment is possibly necessary in conjunction with an accurate, coinciding, vertical setting of fastening means arranged in several T-slot-like recesses or sections. An orientation or alignment of several rails used in flat material form may take place at the end of a hollow section. A longitudinal displacement of the rails within a T-slot permits, to a limited extent, a compensation for manufacturing tolerances, of the parts to be fitted.

According to a development of the invention the rail can be a curved or convex spring plate. The plate may have a convexity, in the inserted state, directed towards the slit-like slot opening and may be appropriately secured and supported with longitudinal edges in corner areas formed by the slot bottom and the side legs.

As securing areas for a lockable spring nut used in preferred manner, central punched out portions are constructed in grid-like manner. In the same way as the stud-like shaped portions of the rail-like metal strip, these portions permit stepped position fixing and adjustment of the spring nut.

For reliable, easily detachable securing purposes the punched out portions of the convex rail are complementary to the punched out studs on the spring webs of the spring nuts. The material for such a spring elastic rail can be metal having very good spring characteristics, e.g. beryllium nickel, beryllium copper, spring brass and stainless steel.

According to a further development of the invention, the rail is constituted by an elastic or resilient flat plastic strip, which, for the reception of the spring web or a locking stud on the spring web of a spring nut, has punched out portions formed by rectangular, square or curved cutouts along one or both lateral edges. Such a flat material permits a stepwise position fixing of a fastening means in a T-slot-like recess.

According to a further development, stepless position securing is made possible by a plastic strip, fixable in the recess, which, at least in the fixing areas provided for the reception of the fastening means, is made from a highly elastic plastics material. In a particularly simple and appropriate variant, the plastic strip is arranged as a sealing material in the T-slot and may be detachably secured or bonded in the slot. The strip is, therefore, firmly positioned. A spring elastic reception of a fastening means, e.g. a lock nut without a spring web, is ensured if the plastic strip has a suitable elasticity and strength.

It is advantageous to use plastic strips with a roughened surface.

BRIEF DESCRIPTION OF THE DRAWINGS

The invention is described in greater detail hereinafter relative to non-limitative embodiments and the attached drawings, in which.

DESCRIPTION OF THE PREFERRED EMBODIMENTS

Figure 1:
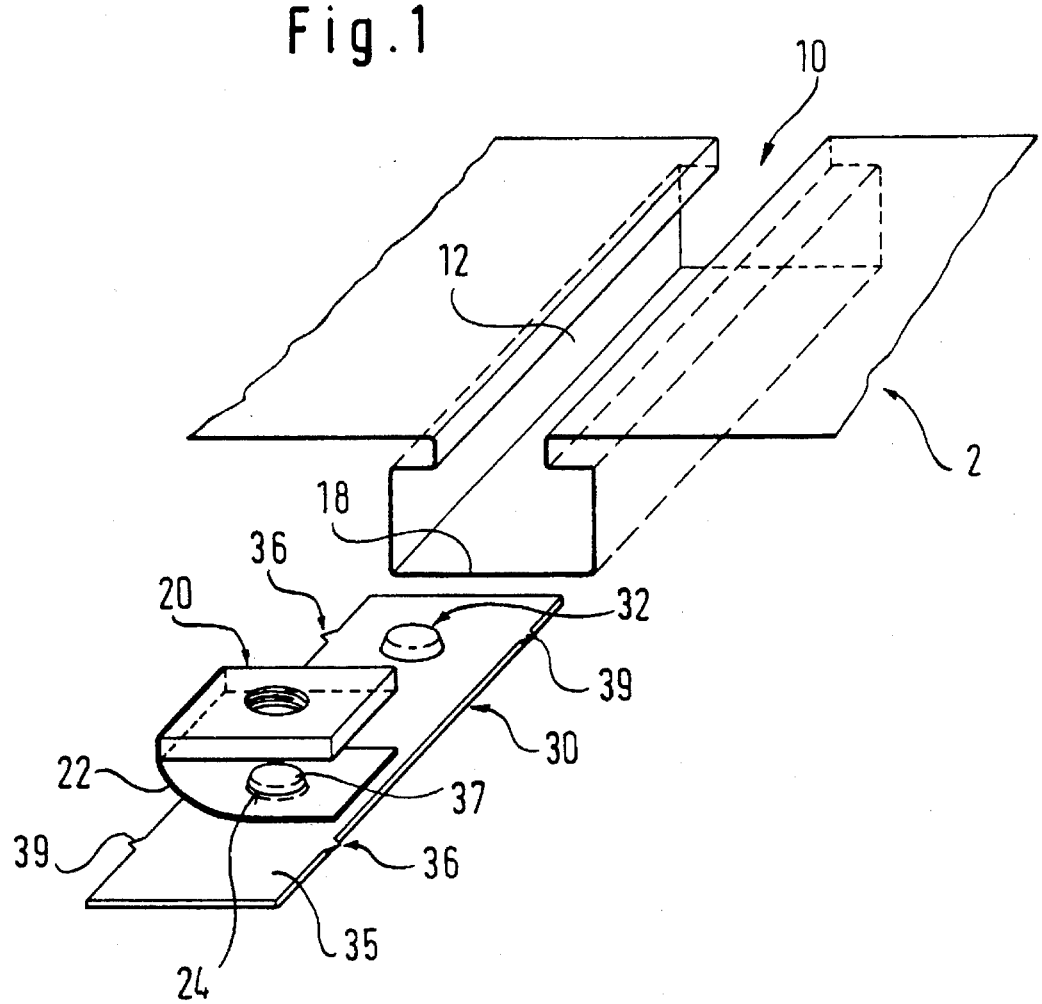
FIG. 1 is a perspective view of an arrangement for a T-slot-like recess according to the invention.

FIG. 1 shows, in detail, an area of a section 2 with a T-slot-like recess 10, in which are placed, in movable and secured manner, spring nuts 20 as fastening means. A metal rail 30 for the spring elastic position fixing of the spring nut 20 is shown as being located outside the T-slot 10 to facilitate understanding. Appropriately, the flat material, e.g. the metal rail 30 shown in FIG. 1, is placed by means of a slit-like opening 12 in the T-slot 10 and is secured to the bottom 18. To this end, on the rail 30, which can be constructed as a thin metal flat strip 35, there are small clamping tips 39 in the form of laterally projecting clamping elements 36. In the represented embodiment the clamping tips 39 are shaped like an equilateral triangle.

In the vicinity of the longitudinal axis of the metal strip 35 are provided, in grid-like manner as securing areas, stud-like shaped portions 32, on which can be engaged the spring nuts 20 of which a top part 37 constitutes a nut with a bore threaded to receive a threaded fastening means such as a screw. Fixed to one side of top part 37 is the top edge of a spring web 22 which curves downward terminating in a free end. A bore 24 is formed in the free end of spring web 22. The bore 24 is adapted to fit around or receive therein a stud-like shaped projection 32 to anchor or lock the spring nut 20 in position in the T-slot. The distance between the stud-like shaped portion 32 and, therefore, the grid size is adapted to the dimensions of the spring nuts 20, so that the latter can be inserted sideways through the slot 12, turned 90° and secured in unimpeded manner.

Figure 2:
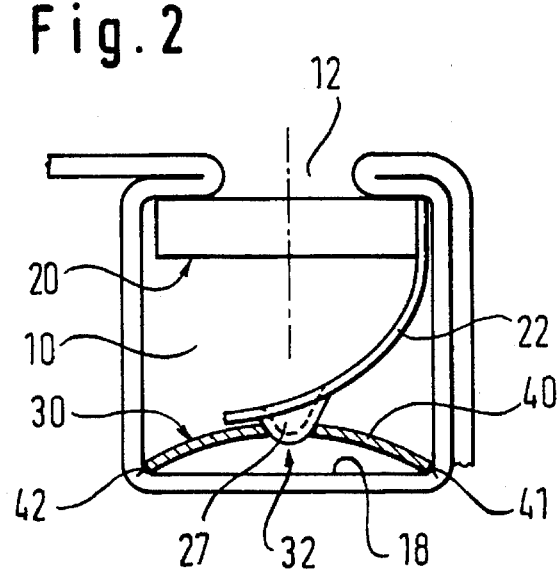
FIG. 2 shows a second embodiment of the arrangement according to the invention.
Figure 3:
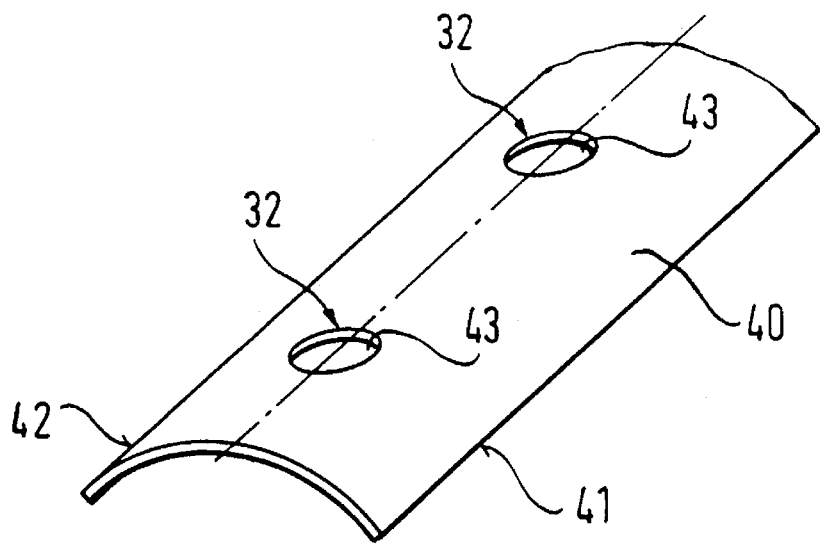
FIG. 3 shows a spring plate provided with fixing areas as the rail for the embodiment according to FIG. 2.

FIGS. 2 and 3 show a second embodiment of the arrangement according to the invention. In these figures, shown as the rail 30 is a convex elastic spring plate 40 forming a spring elastic mounting or receptacle for a fastening means 20. In this embodiment, the fastening means 20 is a spring nut with downward depending spring web 22 fixed at its upper end to one edge of nut. The nut and the web 22 cooperate with the rail 30, in the form of convex spring plate 40, to fix or anchor or lock the fastening means 20 in place. To this end, the spring plate 40 is provided with securing areas 32 which, in this embodiment, are formed by punched out portions or holes 43. These punched out portions or holes are complementary to the pressed out or punched out triangular shaped locking elements 27 on the free end of spring web 22 of the spring nut 20. FIG. 2 shows that the arrangement, according to the invention, ensures a particularly reliable position fixing of a fastening means 20. The curved spring plate 40 is supported and fixed by means of longitudinal edges 41, 42 on the slot bottom 18.

Figure 4:
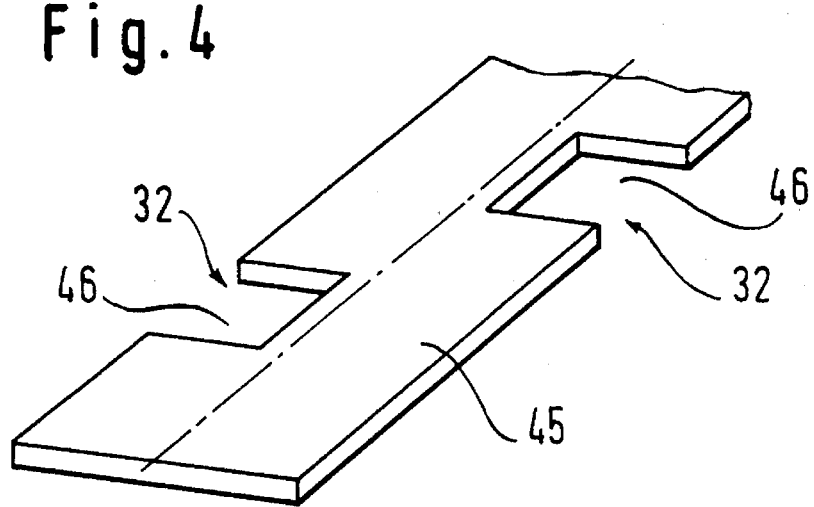
FIG. 4 shows an elastic plastic strip with lateral recesses as a further arrangement according to the invention.

As a further alternative variant for a rail 30, FIG. 4 shows, in a diagrammatic manner an elastic flat plastic strip 45. The securing areas 32 are constituted by almost square punched out portions 46, which simultaneously facilitate the insertion and fixing of the plastic strip in a recess. The punched out portions 46 cooperate with projections suitably formed on the free ends of downward depending spring webs 22 to lock, fix or anchor spring nuts 20 in a T-slot 10.

Other variations and modifications of the present invention will be apparent to one skilled in the art from the teachings contained herein. Such variations and modifications are deemed to fall within the purview of the invention as claimed herein.

What is claimed is:

1. An arrangement for spring elastic position fixing of spring nuts in a T-slot comprising:

an elongated rail having longitudinally spaced locking areas and insertable in the T-slot;

laterally positioned clamping elements for detachably fixing said elongated rail in the T-slot;

spring nuts, including spring webs, elastically received in said locking areas by bores in said spring webs; and stud-like shaped portions in said locking areas onto which the spring nuts can be clipped by said bores in said spring webs.

2. An arrangement according to claim 1, wherein the elongated rail is a flat metal strip on which the stud-like shaped portions are provided in a grid-like pattern.

3. An arrangement according to claim 1, wherein the clamping elements are formed by uniformly spaced laterally extending clamping tips near which the rail has a width which is slightly wider than that of the T-slot.

4. An arrangement according to claim 3, wherein each of the clamping tips has a resilient, wedge-shaped construction.

5. An arrangement according to claim 1, wherein the elongated rail is a flat plastic strip having lateral edge recesses cooperating with the spring webs to fix the spring nuts in said T-slot.

6. An arrangement according to claim 1, wherein the elongated rail is fixed as a highly elastic flat strip having a suitable elasticity and strength to elastically fix said spring nuts in position.

7. An arrangement for spring elastic position fixing of spring nuts in a T-slot comprising:

an elongated rail inserted and detachably fixed at a bottom of the T-slot, the rail being formed as a curved spring plate fixable by having longitudinal edges thereof fitted into lower opposing corners of the T-slot, said curved spring plate being provided with punched out portions;

spring nuts, including spring webs, fixed in respective positions by the punched out portions; and lockable projections defined on said spring webs, said punched out portions being constructed in complementary manner to said lockable projections defined on said spring webs of the spring nuts to position each of said spring nuts in said T-slot.

8. An arrangement according to claim 7, wherein the punched out portions are formed substantially longitudinally centrally of said plate and receive locking studs defining said lockable projections.

* * * * *